(12) United States Patent
Dubiel et al.

(10) Patent No.: US 11,483,965 B2
(45) Date of Patent: Nov. 1, 2022

(54) HAND-HELD SPREADER HAVING A BASE ATTACHABLE TO A PLURALITY OF DIFFERENT HOPPERS

(71) Applicant: Chapin Manufacturing, Inc., Batavia, NY (US)

(72) Inventors: David J. Dubiel, North Chili, NY (US); William James Campbell, Akron, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 300 days.

(21) Appl. No.: 15/970,479

(22) Filed: May 3, 2018

(65) Prior Publication Data

US 2018/0368309 A1    Dec. 27, 2018

Related U.S. Application Data

(60) Provisional application No. 62/502,344, filed on May 5, 2017.

(51) Int. Cl.
| | |
|---|---|
| *A01C 15/00* | (2006.01) |
| *A01C 7/02* | (2006.01) |
| *A01C 15/02* | (2006.01) |
| *E01C 19/20* | (2006.01) |

(52) U.S. Cl.
CPC ............... *A01C 15/006* (2013.01); *A01C 7/02* (2013.01); *A01C 15/02* (2013.01); *E01C 19/203* (2013.01);

(Continued)

(58) Field of Classification Search
CPC ......... A01C 7/02; A01C 15/006; A01C 15/02; A01C 15/003; E01C 2019/206; E01C 19/203; E01C 19/2005
See application file for complete search history.

(56) References Cited

U.S. PATENT DOCUMENTS 4,497,264 A  *  2/1985  Pickett  .................... A01C 7/02
                                                    111/73
4,681,265 A  *  7/1987  Brabb  .................... A01C 15/02
                                                    239/665

(Continued)

OTHER PUBLICATIONS

Chapin Mannufacturing; Chapin 84150 1.5-Liter Poly Hand Crank Spreader, Spreader—Model #84150, Retrieved from https://chapinmfg.com/Product/slug/chapin-84150-15-liter-poly-hand-crank-spreader.

(Continued)

*Primary Examiner* — Christopher R Dandridge
(74) *Attorney, Agent, or Firm* — Woods Oviatt Gilman LLP; Katherine H. McGuire, Esq.

(57) ABSTRACT

A hand-held spreader is provided having a base with a mechanism for spreading particulate material response to turning a hand crank. The base is universally attachable to hoppers of different types which provide particulate material to the base for spreading. Different types of hoppers when attached to the base can adapt the spreader to spread different particulate material, such as of seed or salt. Teeth may be provided along upper edge of the hopper for use in scooping up particulate material into the hopper. Another type of hopper which can be attached to the base has a closed top end to provide a sealed container of particulate material, and has a sealing member releasable from the hopper to allow flow of particulate material from the hopper to the attached base.

13 Claims, 11 Drawing Sheets

(52) U.S. Cl.
CPC .... *E01C 19/2005* (2013.01); *E01C 2019/206* (2013.01)

(56) References Cited

U.S. PATENT DOCUMENTS

| | | | | |
|---|---|---|---|---|
| 5,123,598 | A * | 6/1992 | Courtney | A01C 15/02 222/473 |
| 5,638,988 | A * | 6/1997 | Rogers | B65D 5/445 141/330 |
| 5,842,648 | A * | 12/1998 | Havlovitz | A01C 15/02 239/650 |
| 9,198,345 | B2 * | 12/2015 | Kendall | A01C 15/006 |
| 2004/0026544 | A1 * | 2/2004 | Williams | E01C 19/203 239/682 |

OTHER PUBLICATIONS

Scotts; Scotts Handy Green II Hand-Held Broadcast Spreader, Retrieved from https://www.scotts.com/en-us/products/spreaders/scotts-handy-green-ii-hand-held-broadcast-spreader.

Scotts; Quick Start Guide, Scotts Handy Green II Hand-Held Broadcast Spreader, 2011, The Scotts Company LLC.

Walmart.com, Precision HHBS-125 6 Lb Capacity Handheld Broadcast Spreader, Retrieved from https://www.walmart.com/ip/Precision-HHBS-125-6-Lb-Capacity-Handheld-Broadcast-Spreader/21375591?action=product_interest&action_type=title&item_id=21375591&place.

Amazon.com, Plantmates 76500 All-Purpose Spreader, Retrieved from https://www.amazon.com/Plantmates-76500-All-Purpose-Spreader/dp/B00004RA9D/ref=pd_sim_86_8?ie=UTF8&dpID=41udu7gs7NL&dpSrc=sims&preST=_.

Amazon.com, Solo, Inc., Solo 421 20-Pound Capacity Portable Chest-mount Spreader with Comfortable Cross-shoulder Strap, Retrieved from https://www.amazon.com/421S-20-Pound-Capacity-Portable-Spreader/dp/B000BWZD0O.

Scotts; Scotts Wizz Spreader, Retrieved from https://www.scotts.com/en-us/products/spreaders/scotts-wizztm-spreader.

Scotts; Scotts Easy Hand-Held Broadcast Spreader, Retrieved from https://www.scotts.com/en-us/products/spreaders/scotts-easy-hand-held-broadcast-spreader.

* cited by examiner

HAND-HELD SPREADER HAVING A BASE ATTACHABLE TO A PLURALITY OF DIFFERENT HOPPERS

FIELD OF THE INVENTION

The present invention relates to a hand-held spreader for distributing particulate material, such as, seeds, salt, fertilizer, or the like, and in particular to, a hand-held spreader having a base with a hand-operated mechanism for spreading particulate material from one of a plurality of different hoppers attachable onto the base. This invention is advantageous by providing a base universally attachable to hoppers of different type or configuration to facilitate providing hand-held spreaders that can be used for distributing different sized particulate material, and where such hoppers may be sealed until use is desired. Thus present invention may further be considered as relating to a system providing different hand-held spreaders each having a different type of hopper for particulate material attachable to a common base housing a mechanism for spreading particulate material.

BACKGROUND OF THE INVENTION

Conventional hand-held spreaders typically have an upper compartment, often called a hopper, having particulate material which falls onto a rotating impeller that discharges such particulate material away from the spreader, thereby distributing such particulate material onto a surface. The flow rate along the path onto the impeller is set so it can properly project particulate material from the spreader without clogging, while allowing particulate material to readily flow by gravity through opening(s) at the bottom of the hopper up to a desired maximum rate. Due to differences in particulate size, hand-held spreaders often cannot properly spread different types of particulate material. For example, a spreader designed for use in distributing seeds cannot be readily be used for spreading salt, and vice versa, since seeds are often much smaller than salt crystals used for melting snow and ice. Accordingly, manufacturers have had to design different hand-held spreaders for spreading different types of particulate material of seed or salt, or add additional complexity to make spreaders settable to internally adapt the spreader to use different types of particulate material. Thus, it would be desirable to provide a hand-held spreader of a universal base design that can be readily adapted to different spreading applications, of seed, salt, or other particulate materials with either open, or closable top ends.

SUMMARY OF THE INVENTION

Accordingly, it is an object of the present invention to provide an improved hand-held spreader having a base with a mechanism for spreading particulate material which is universally attachable to hoppers of different type or configuration.

It is another object of the present invention to provide an improved hand-held spreader having a base with a mechanism for spreading particulate material which is universally attachable to each of different hoppers in which different hoppers can readily adapt the spreader to spread different particulate material, such as of seed or salt.

A further object of the present invention is to provide an improved hand-held spreader having a base with a mechanism for spreading particulate material which is universally attachable to each of different hoppers in which another of such hoppers has a closed top end to provide a sealed container having a bottom opening closed by a releasable strip, which when released enables flow of particulate material through the bottom opening to the base for spreading.

A still further object of the present invention is to provide a system providing different hand-held spreaders each having a different type of hopper attachable to a common base with a spreading mechanism.

Briefly described, the hand-held spreader embodying the present invention has a base having a top wall, a rotationally mounted impeller below such top wall for discharging from the base particulate material falling via an opening in the top wall along a path onto the impeller, and a receptacle configured for receiving at least a portion of a selected one of a plurality of different hoppers to provide the particulate material from the selected hopper to the opening of the base. To retain a selected hopper to the base, one or more latching members each engage into an opening, where such latching member(s) are along one of the selected hopper or base, and the opening for engaging each of the latching member(s) is along the other of the selected hopper or base.

Each of the plurality of hoppers has a bottom opening alignable over the opening of the base for particulate material contained in the hopper to fall through when attached onto the base. A first type of hopper has its bottom opening dimensioned in accordance with a first type of particulate material which has seed. A second type of hopper has its bottom opening dimensioned in accordance with a second type of particulate material which has salt. A third type of hopper has its bottom opening that may be in accordance with either the first or second types of particulate material, but unlike the first and second types of hoppers, the third type of hopper is sealed by a sealing member until its bottom opening is opened to provide particulate material from the hopper to the base. The sealing member may be a removable strip having adhesive adhering to a part of the hopper about its bottom opening.

The invention further provides a system having a plurality of different attachable hoppers each with a bottom opening, and a base universally attachable to each of the hoppers, to provide a plurality of different hand-held spreaders when attached to each of different hoppers. The base has a handle, and a mechanism for spreading particulate material from each of the different hoppers when attached to the base so that the particulate material falling from the bottom opening of an attached hopper is distributed by the mechanism from the base.

Each of the different hoppers is a container having side walls and a bottom wall with the bottom opening. The container may have an open top end for receiving particulate material into the container, or a top end having an opening closable by a cap. The bottom opening of a first type of hopper accommodates flow of seed particulates to the spreading mechanism of the base, while the bottom opening of a second type of hopper is larger to accommodate flow of salt particulates to the spreading mechanism. Thus, the bottom opening of two or more of the hoppers are differently sized in accordance with particulate material in the hopper for proper flow of such material into the base for spreading. The second type of hopper may have an open top end with an upper edge forming a plurality of teeth. Such teeth can facilitate use of the hopper when attached to the base as a hand scoop to manually scoop up salt from a container, such as a bag or bucket, into the hopper for use in spreading on walkways or road surfaces for melting ice or snow. Salt particulates tend to clump and the teeth can break them up as they are scooped into the hopper.

A third type of hopper is a container having an upper end with an opening closed by a cap, and a strip of flexible material extending along an exterior of the container over the bottom opening of the hopper, sealing particulate material contained in the hopper. When spreading is desired, an upper end of the strip, which extends upwards along the container to the top thereof, has a pull tab to release the strip and open the bottom opening of the hopper enabling flow of particulate material from bottom opening to the base for spreading. A passageway for the strip is provided between the base and the hopper enabling release of the strip from the spreader.

To attach each of the different hoppers to the base, a slide member along the hopper is provided having two opposing channels that slide into a receiver member along the base having two rails which ride along such channels until latching members, such as tabs, along the channels engage into openings along the rails in order to fixably attach the hopper to the base. As the hopper's slide member slides along the receiver member, a front projecting member from the hopper extends through an opening in a support member or cradle of the base that provides a receptacle for supporting a lower portion of the exterior sides and bottom of the hopper. While preferably the slide member is along each of the hoppers and the receiver member along the base, such slide member may instead be along the base and the receiver member along each of the hoppers to similarly enable attachment of the base to each of the hoppers.

The mechanism for spreading in the base may be provided by an impeller mounted in a chamber in the base for rotation responsive to a hand crank along one side of the base. Particulate material, via the bottom opening the hopper attached to the base, fall along a path into the base onto such impeller which when rotated discharges the particular material from the spreader through a discharge opening along the chamber. When each hopper is attached to the base, the bottom opening of the hopper aligns over an opening in the base to provide such path for particulate material onto the impeller for spreading from the base when hand crank is rotated. The bottom of one or more of the hoppers may also have a hole for mounting a rotatable agitator to a shaft of the impeller so that rotation of the impeller rotates the agitator. The agitator when present assists in moving and breaking up particulate material along the interior bottom of the hopper to facilitate flow through the bottom opening of the hopper.

A movable gate in the base is disposed along the path of particulate material to the chamber. The gate is mechanically coupled to a trigger along a handle portion of the base. The trigger is biased forward to normally close such path to prevent particulate material from falling onto the impeller, and backward motion of the gate by pulling back the trigger enables flow along such path.

While the particulate material for use with hoppers may be referred to herein as seed or salt, such may further include different or other materials as desired by the user of the spreader.

BRIEF DESCRIPTION OF THE DRAWINGS

The foregoing and other objects, features and advantages of the invention will become more apparent from a reading of the following description in connection with the accompanying drawings in which:

FIGS. 13 and 14 are right side views of hand-held spreader of the hand-held spreader of the present invention in accordance with a third embodiment with the hopper of the third type of FIGS. 11 and 12 shown attached to the base of the spreader, in which FIG. 13 shows the strip sealing the bottom opening of the hopper, and FIG. 14 show the strip removed after being released from the spreader;

DETAILED DESCRIPTION OF THE INVENTION

Figure 1:
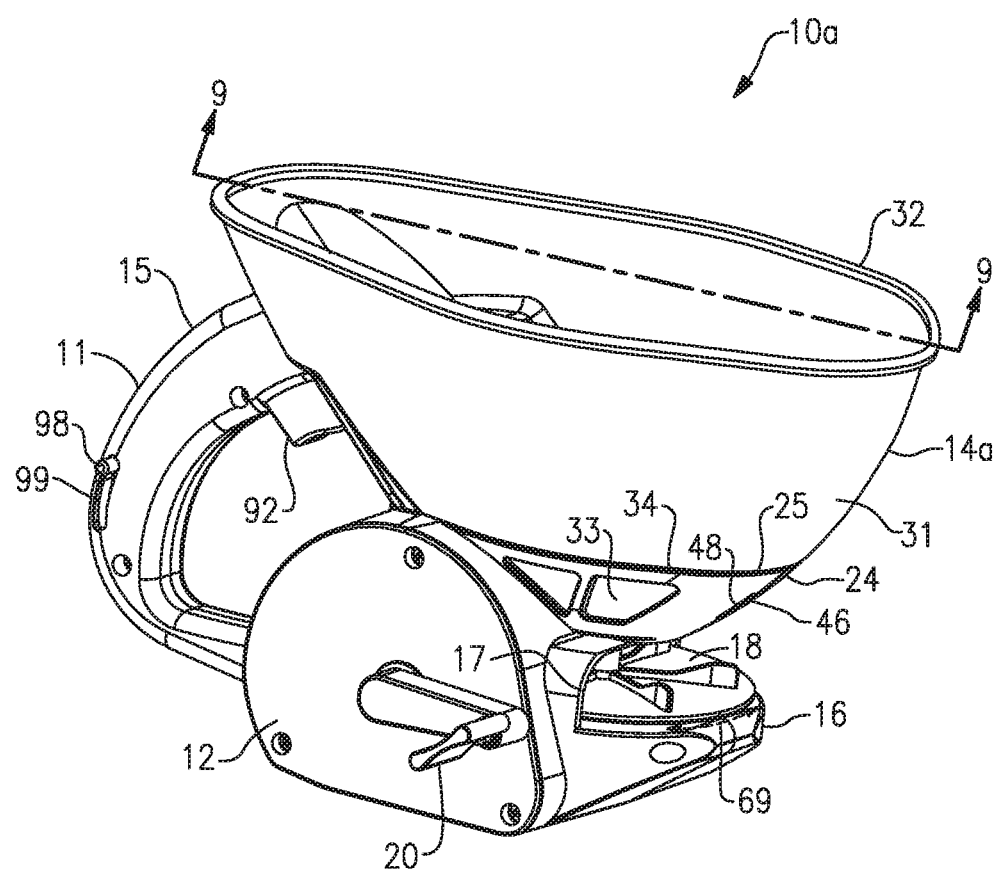
FIG. 1 is a front perspective view of the base of the hand-held spreader shown attached to a hopper of a first type, such as for seed particulate material of a hand-held spreader of the present invention in accordance with a first embodiment.
Figure 4:
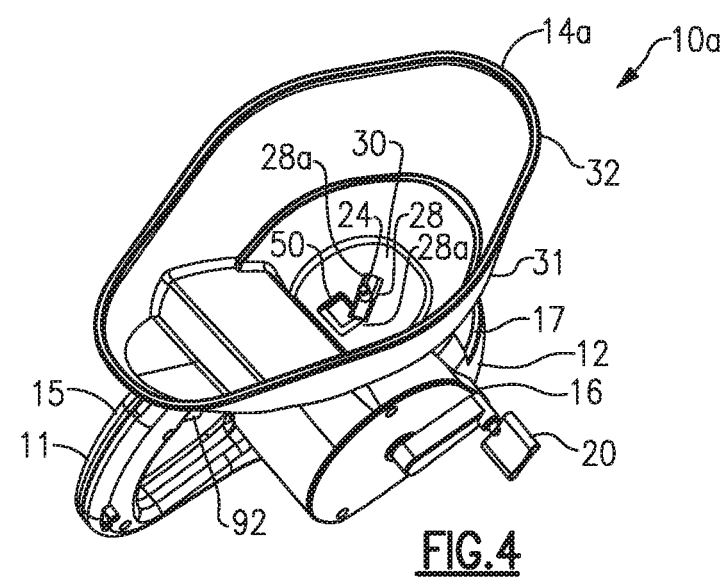
FIG. 4 is a top perspective of the spreader of FIG. 1.

Referring to FIGS. 1 and 4, a spreader 10a is shown, in accordance with a first embodiment of the present invention, having a base 12 attached to a hopper 14a of a first type. Base 12 has a handle portion 15 providing a handle 11 for hand carrying the spreader 10a, and a distributor portion 16 having a mechanism provided by a rotationally mounted impeller 18 for spreading particulate material received from hopper 14a out of base 12 through a discharge opening 17. Such impeller 18 rotates responsive to turning a hand crank 20 which is mechanically coupled to the impeller. Base 12 further has a mechanism for controlling the flow of particulate material from hopper 14a onto the impeller 18 using a trigger 92 mounted adjacent handle 11 along the handle portion of base 12.

There are three types of hoppers 14a (FIGS. 1-4), 14b (FIGS. 5-8), and 14c (FIGS. 11-14). Hoppers 14a, 14b, and 14c (14a-c) are each attachable to base 12 to provide hand-held spreaders 10a, 10b, and 10c, in accordance with first, second, and third embodiments, respectively, of the present invention. Each of the hoppers 14a-c has the same mechanism for engaging base 12, but differ in configuration as will be described below. In this manner base 12 is universally attachable to the hoppers. Base 12 will be described first described in connection with hopper 14a.

Figure 2:
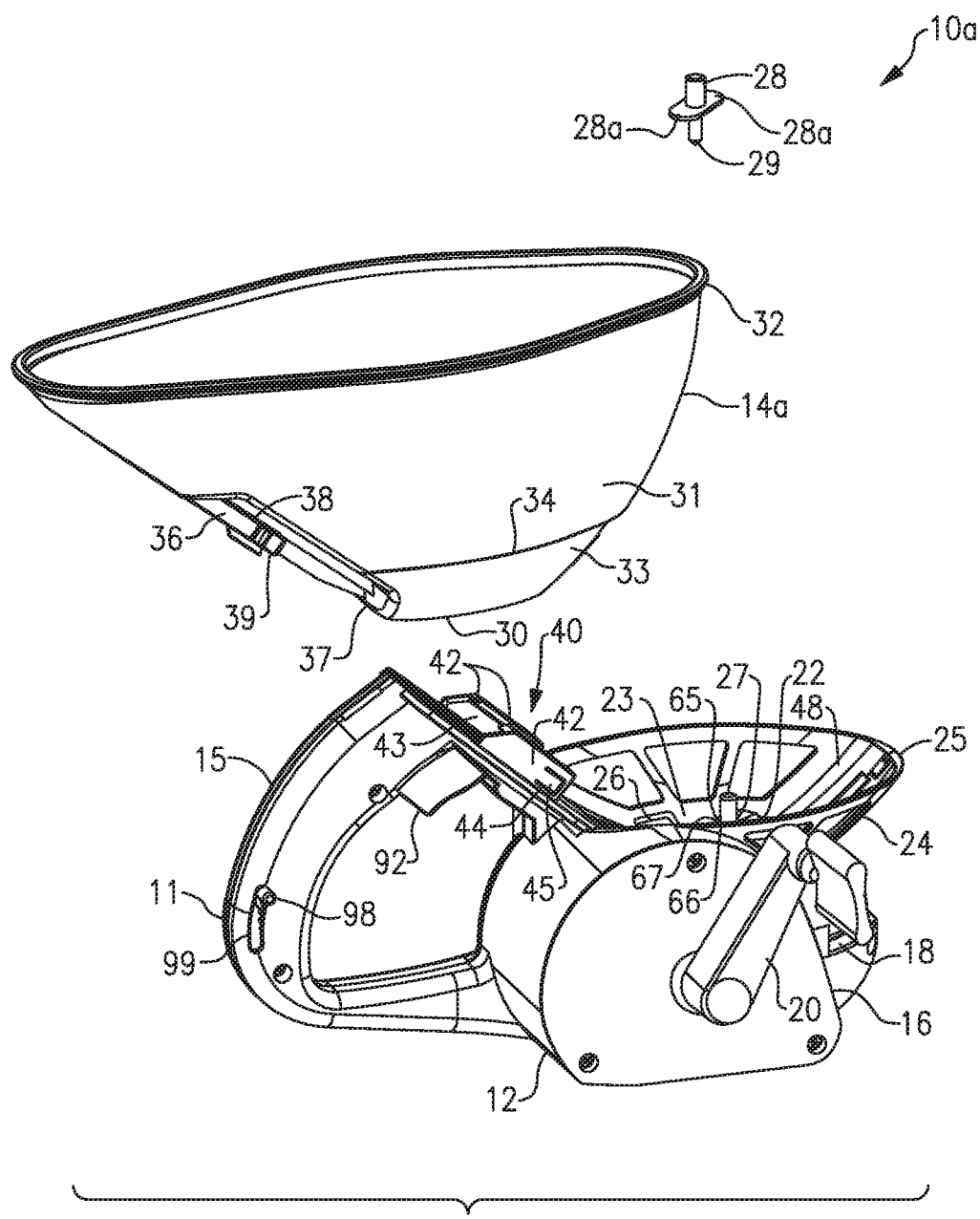
FIG. 2 is a perspective view of the hopper of the first type and the base of the spreader of FIG. 1 prior to their attachment.
Figure 3:
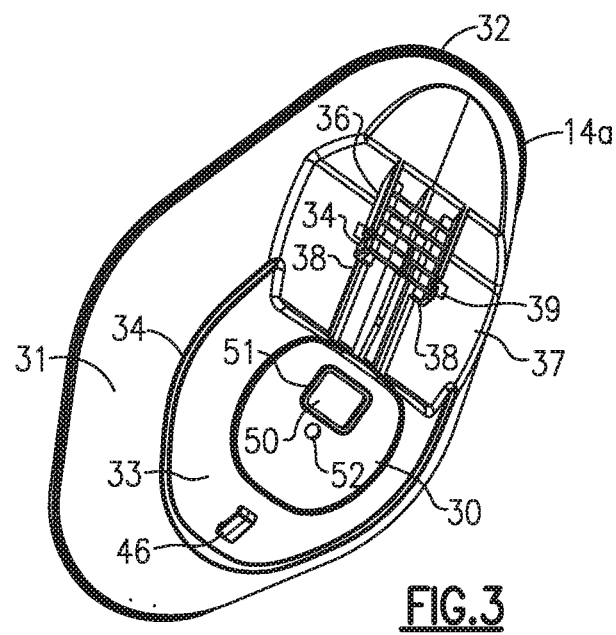
FIG. 3 is a bottom perspective of the hopper of the first type of FIGS. 1 and 2 shown apart from the base of the spreader.

With hopper 14a shown prior to attachment to base 12, FIG. 2 shows a top wall 22 of the base 12 having a flat portion 23 which extends upward to form a cradle support member 24. Top wall 22 extends in a rear upward direction at an upward angle along handle portion 15. An opening 26 and a hole 27 is provided along flat portion 23a of base 12. Opening 26 provides a path for particulate material to fall onto impeller 18 in the base 12, while hole 27 presents a hole 65a of an upper end 67 of the shaft 66 of impeller 18 for mounting a shaft 29 of an agitator 28, as will be described later below in connection with FIGS. 9 and 10.

Hopper 14a is generally oblong in shape and has a bottom wall 30 and sides 31 that extend upwards to an open top end 32. Sides 31 of hopper 14a can seat on a cradle 24 by having a lower portion 33 with curvature that conforms or follows the contour of cradle 24 of base 12, and bottom wall 30 that extends over flat portion 23 of base 12. When properly seated on base 12, an exterior step or ridge 34 along sides 31 rest upon the top edge 25 of cradle 24. Such ridge 34 extends at or approximately 1/16 inches downward from bottom wall 30.

The mechanism for attaching hopper 14a to base 12 is provided by a slide member 36 and a receiver member 40. Slide member 36 extends from a rear exterior angled portion 37 of hopper 14a that is at (or approximately) the same angle top wall 22 of base 12 extends along handle portion 15. Slide member 36 has two opposing channels 38. At the end of each of the channels 38 is an outwardly extending tab (or latching member) 39. The receiver member 40 extends along angled top wall 22 of handle portion 15 of base 12, and has two rails 42 defining a slot 43, where rails 42 mirror each other on opposite sides of slot 43. At the end of each rail 42 is a cut out opening 44 having a break away tab 45. To attach hopper 14a to base 12, slide member 36 is received in slot 43 so that rails 42 engage channels 38, in which tabs 33 are inwardly depressed (and/or apply an outward force on rails 42). Slide member 30 slides along the downward angle along wall 22 of handle portion 15 in slot 43 until tabs 39 extend outward to engage into openings 44 along the rails 43 to cause break away tab 45 to break off, and thereby fixably attaching hopper 14a to the base 12. As slide member 36 is positioned into an attached state with base 12, the lower portion 33, step 34, and bottom wall 30 of hopper 14a are seated upon cradle 24 and base portion 23 of base 12, as described above. Less preferably, a single one of tabs 39 may be used along the slide member to engage into a single one of openings 44.

The mechanism for attaching hopper 14a to base 12 further has a projecting member 46 which extends from the front of lower portion 33 of hopper 14a so that projecting member 46 is received into an opening 48 of cradle 48, such that front of the hopper 14a is retained to base 12 simultaneously as rear hopper slider member 36 slides into position along receiver member 40.

With the hopper 14a attached to base 12, an opening 50 extending through bottom wall 30 is disposed over opening 26 of base 12, where opening 50 is sized for flow of particulate material associated for use with hopper 14a. For example, opening 50 may be dimensioned having a width of 0.63 inches, and a length of 0.79 inches, and centered over opening 25 which may have the same width, but larger in length, such as 1.3 inches. A lower ridge 51 extends from the exterior of bottom wall 30 about opening 50. Such ridge 51 aligns to rest upon top wall 22 of base 12 along the upper edge of opening 26 to avoid or minimize any particulate material passing from hopper 14a through opening 50 and opening 26 into base 12 from undesirably entering between bottom wall 33 of hopper 14a and top wall 22 of base 12.

A hole 52 extends through bottom wall 30 of hopper 14a and aligns with hole 65a of impeller shaft 66 so that shaft 29 of agitator 28 can be inserted after attachment of hopper 14a to base 12 into holes 52 and 65a to connect agitator 28 to impeller 18. Rotation of impeller 18 is thus coupled to agitator 28 and its two extending members 28a spaced above the interior surface of bottom wall 30. The extending members 28a rotate long such interior surface to move particulate material when present in hopper 14a and can assist in breaking up any clumps of particulate material in hopper 14a so that they can fall through opening 50 during operation of spreader 10a.

Figure 5:
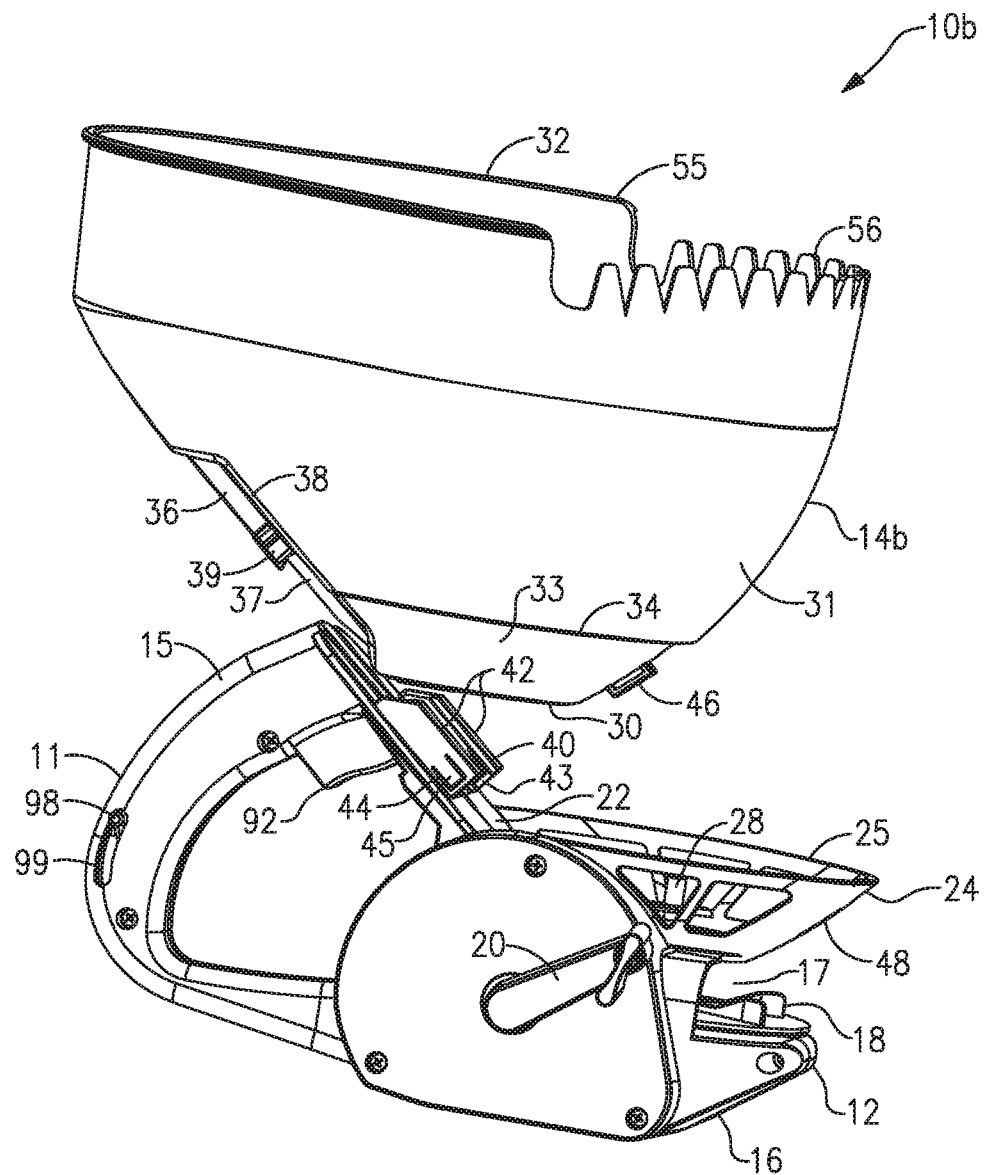
FIG. 5 is a right side perspective view of a hopper of the second type, such as for use with salt particulate material, prior to attachment to the base of a spreader of a hand-held spreader of the present invention in accordance with a second embodiment.
Figure 6:
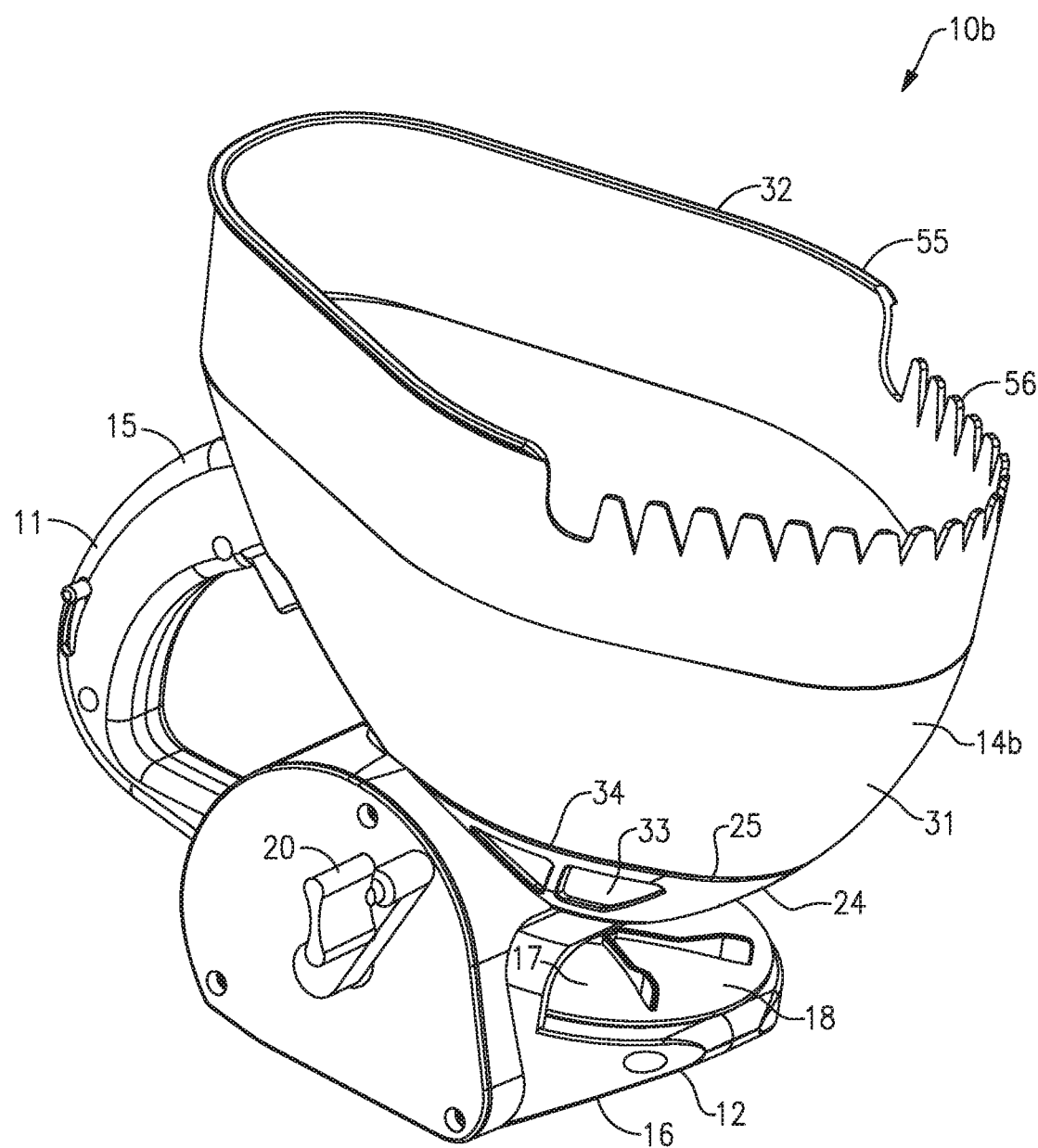
FIGS. 6 and 7 are front and rear perspective views, respectively, of the hand-held spreader in accordance with the hopper of the second type of FIG. 5 shown attached to the base of the spreader.
Figure 7:
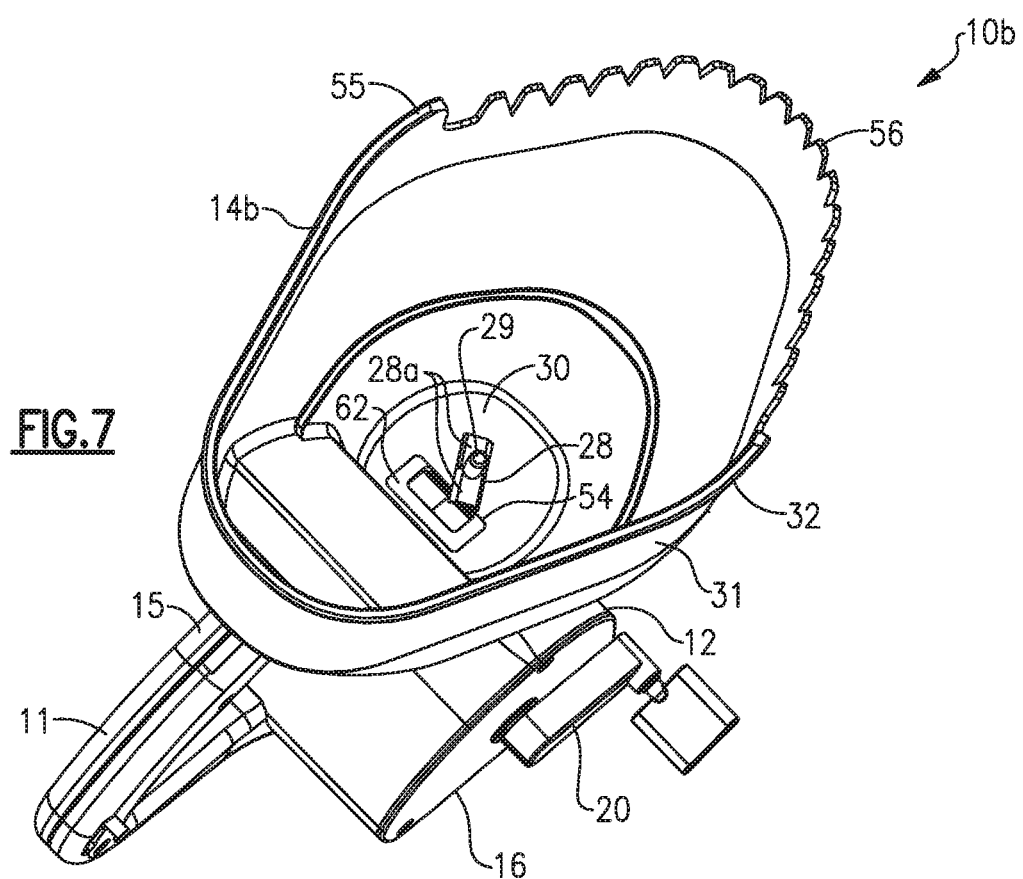
Figure 8:
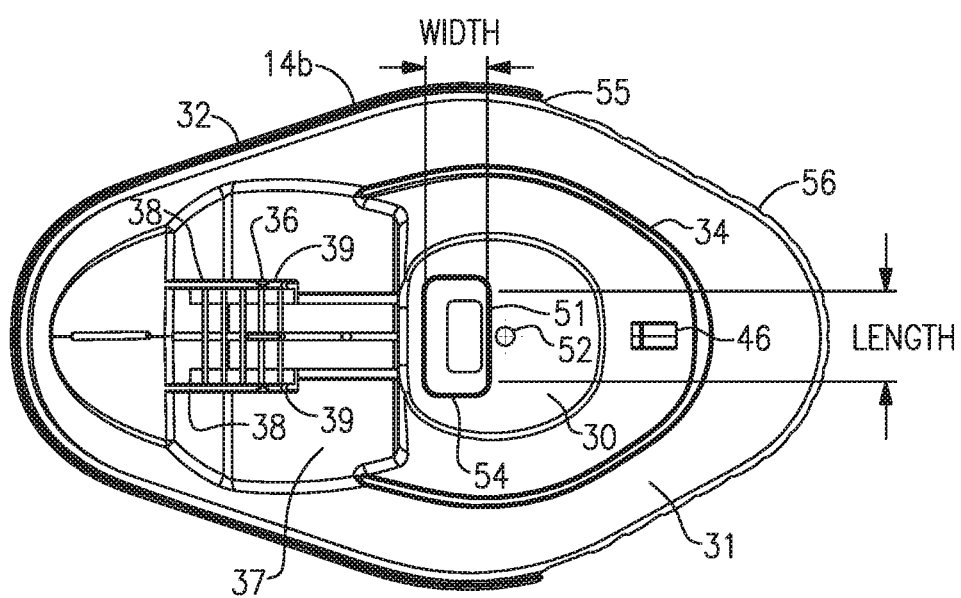
FIG. 8 is a bottom view of the hopper of the second type of FIGS. 5-7 apart from the base of the spreader.

Referring to FIGS. 5-8, a hopper 14b of the second type is shown, and is the same as hopper 14a and accordingly uses the same reference numerals, but has a larger opening 54 than opening 50 along bottom wall 30 for salt particulate material, such as rock salt, to flow there through to opening 26 of base 12. For example opening 54 may be 0.63 inches in width and 1.3 inches in length, and aligns centered over opening 26 of base 12. Hopper 14b of FIG. 5 attaches to the same base 12 in the same manner as described above for hopper 14a to provide spreader 10b, and seats on base 12 as shown in FIGS. 6 and 7 in the same manner as hopper 14a with an inserted agitator 28.

Optionally, open top end 32 of hopper 14a has an edge 55 having teeth 56 that extend along at least the front of hopper 14b. With hopper 14b attached to base 12 in spreader 10b, such teeth 56 facilitate use of hopper 14b as a scoop for moving salt particulates from a container, such as a bag or bucket, into the hopper 14c while a user holds handle 11. As salt particulate material, such as salt crystals, tend to clump (especially when stored for a period of time), teeth 56 can engage and break them up as they are scooped into hopper 14b. For purpose of illustration, agitator 28 is shown in FIG. 5, but would be removed (if present) from hole 65a of impeller shaft 66 prior to attachment of hopper 14b to base 12.

Figure 9:
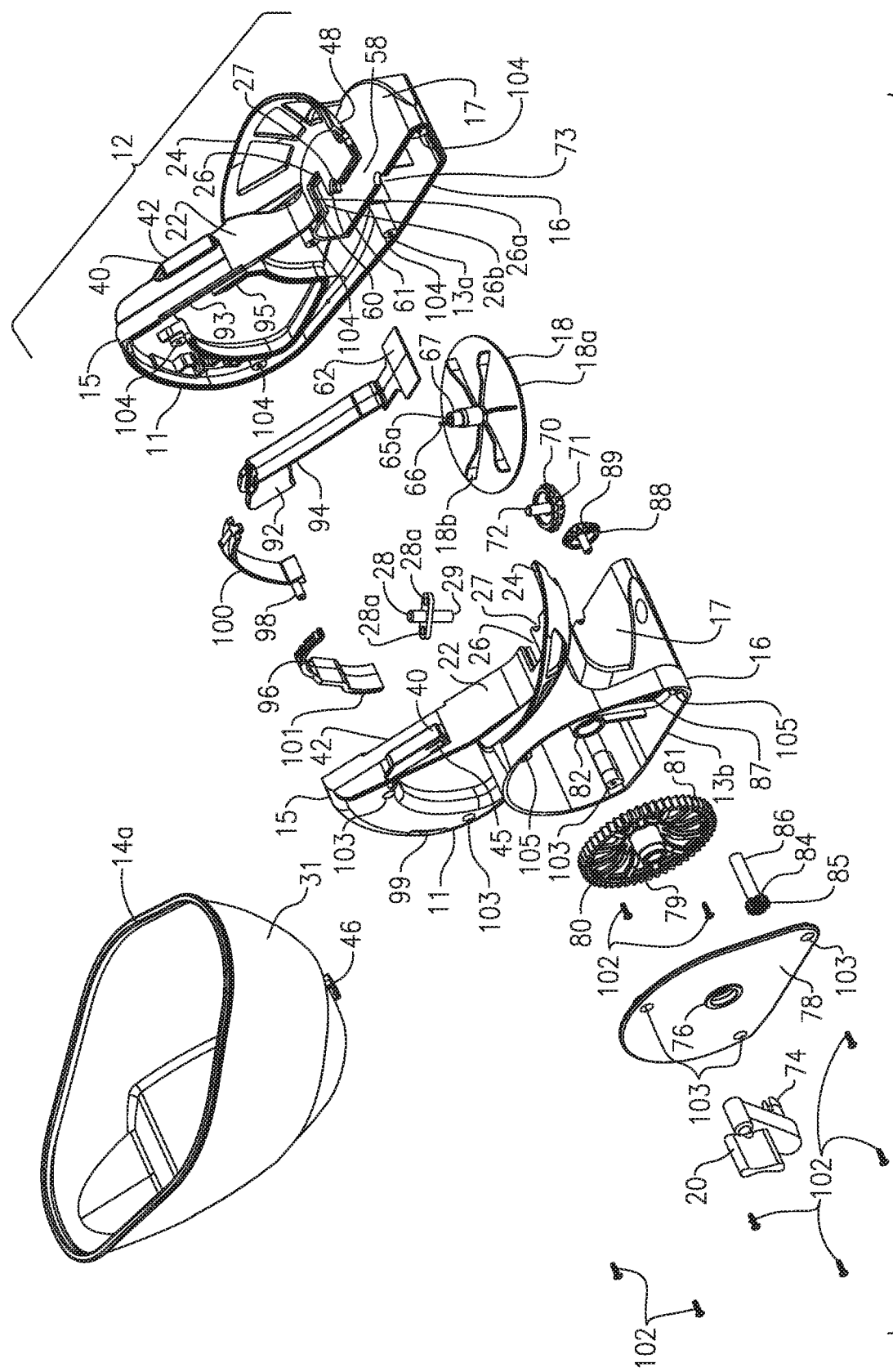
FIG. 9 is a cross-sectional view taken along line 9-9 of FIG. 1 in the direction of arrows at the ends of the line extending along the rotational axis of impeller rotationally mounted in the base of the spreader.
Figure 10:
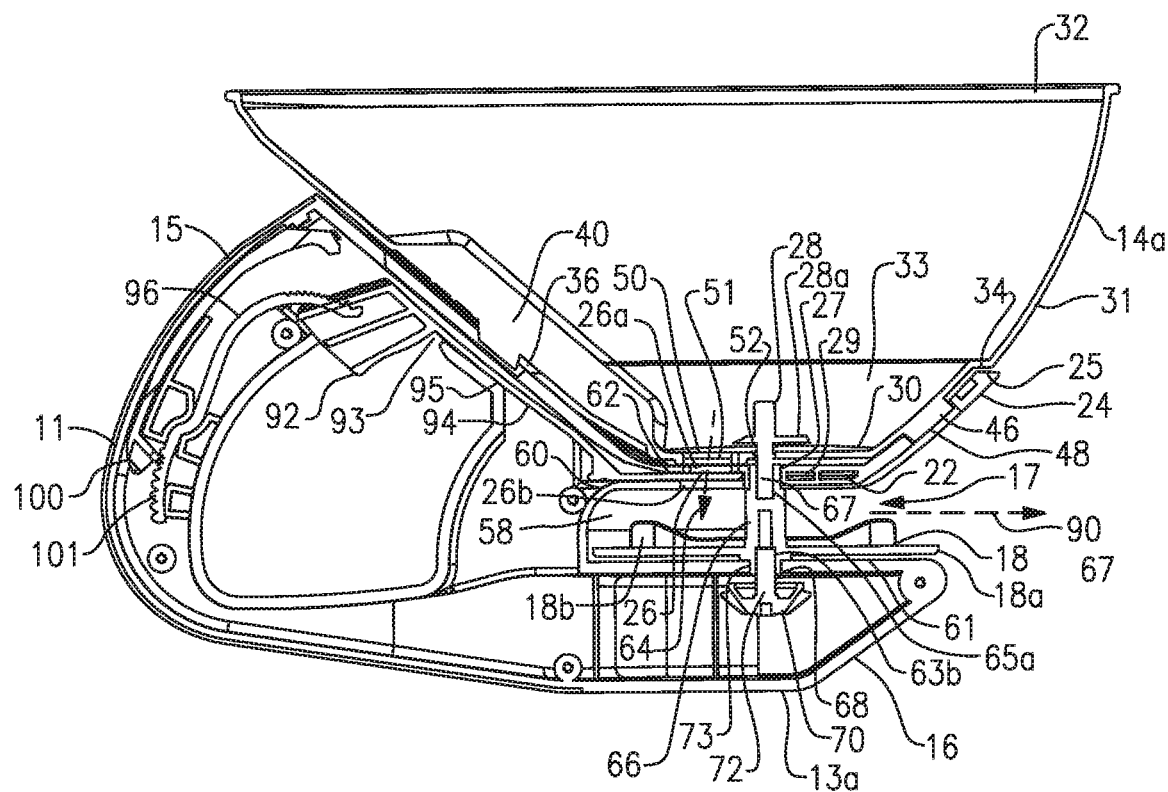
FIG. 10 is an exploded view of the base of spreader in accordance with the present invention in which the hopper of the first type is shown.
Figure 11:
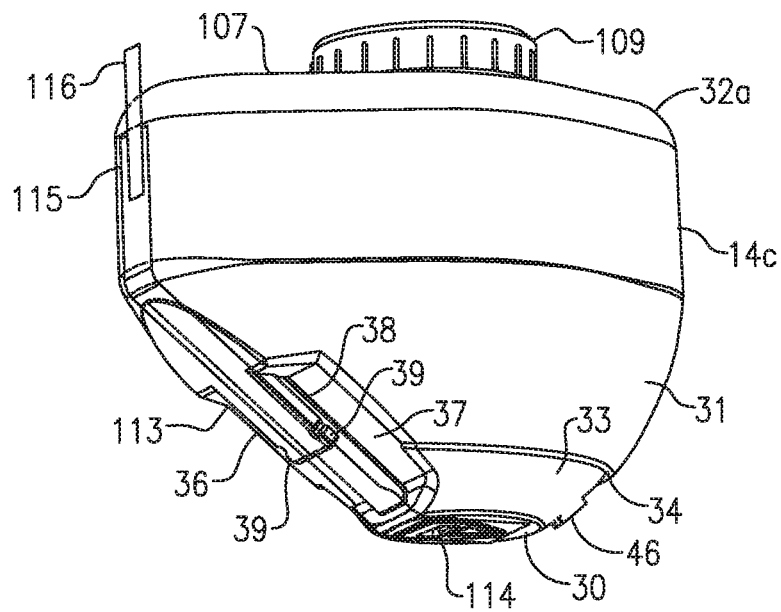
FIG. 11 is a rear perspective view of a hopper of a third type shown apart from the base of the spreader in which a strip seals a bottom opening of the hopper and a cap closes an opening along the top end of the hopper.
Figure 12:
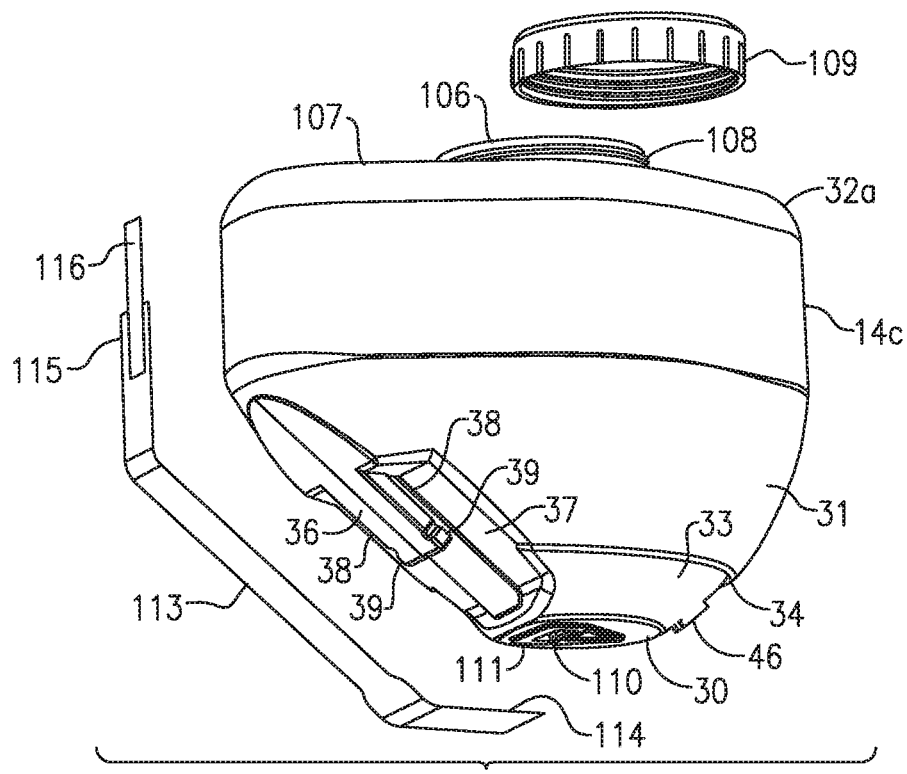
FIG. 12 is an exploded view of hopper of the third type of FIG. 10.
Figure 13:
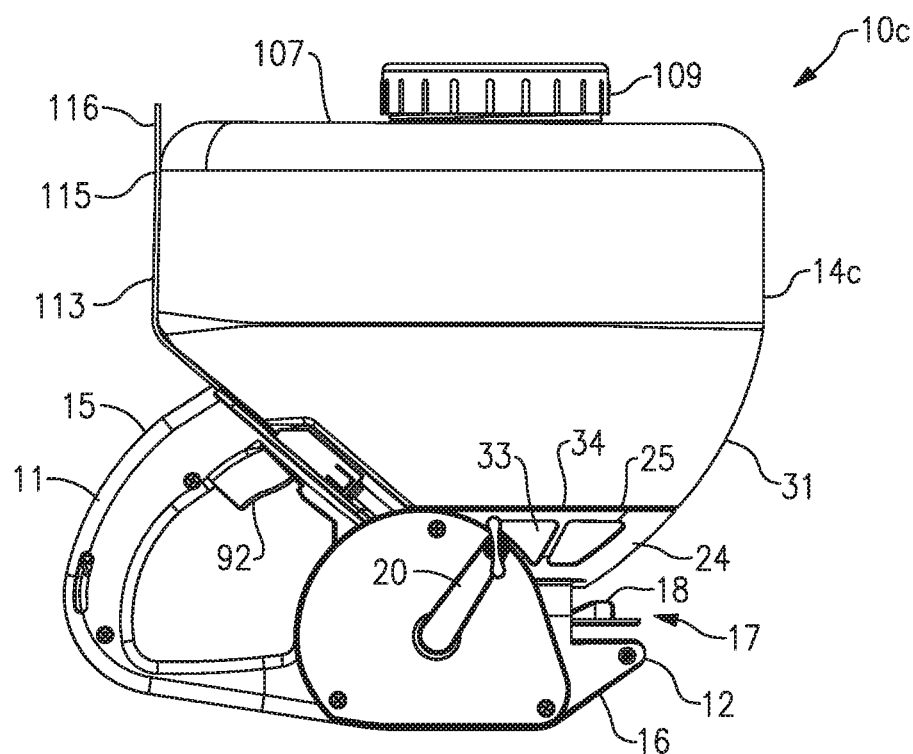
Figure 14:
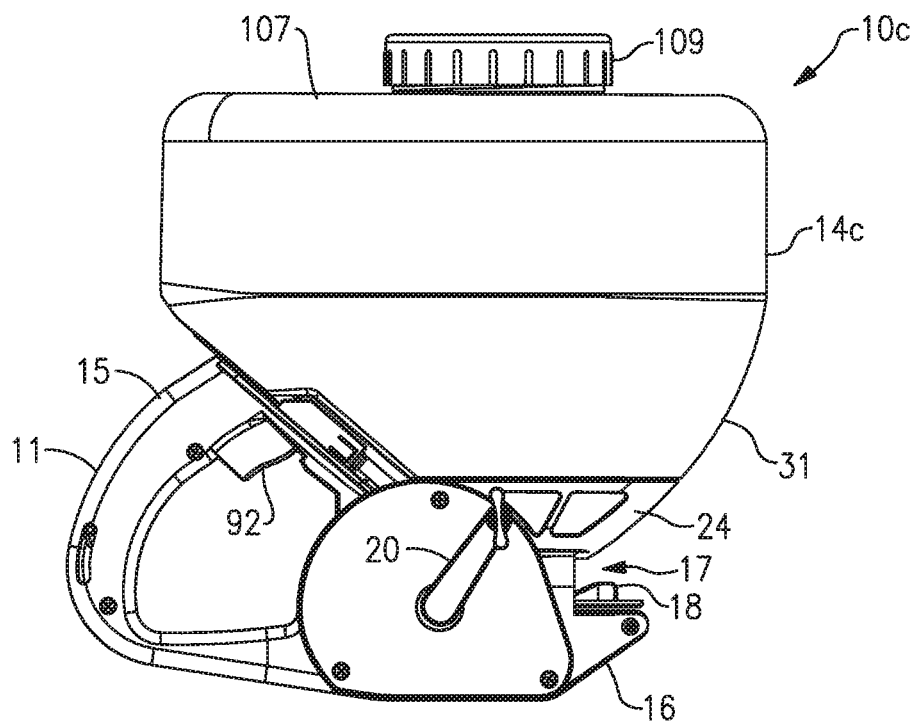

Referring to FIGS. 9 and 10, the assembly of base 12 is shown. Base 12 represents a housing having a left housing portion 13a and right housing portion 13b which mate with each other. Impeller 18 is rotationally mounted in a chamber 58, in which discharge opening 17 is provided along the front and left sides of chamber 58. Chamber 58 has an upper chamber wall 60 and a lower chamber wall 61. Top wall 22 extends just above upper chamber wall 60 to provide a gap into which is disposed a movable gate 62 which is mechanically coupled to trigger 92, as described later below.

Opening 26 extends through top wall 22 and upper chamber wall 60 for particulate material to fall via hopper opening 50 onto impeller 14 along a path 64 illustrated by dashed arrow (FIG. 10). Gate 62 is shown in a closed state over opening 26 in FIG. 10, but movable backwards to an open state to enable flow along path 64. Impeller 18 is a circular platform 18a with multiple vanes 18b, and has a shaft 66 with an upper end 67 and lower end 68. The upper end 67 of impeller shaft 66 extends upwards through hole 27 that extends through upper chamber wall 60 and top wall 22 (see FIGS. 2 and 10). Such shaft 66 defines the axis of rotation the impeller 18, as indicated by arrow 69 in FIG. 1. Shaft 29 from agitator 28 is received in a hole 65a in upper end 67 of shaft 66 (and hole 52 of hopper 14a or 14b when attached to base 12). A gear 70 has a shaft 72 which extends through a hole 73 in lower chamber wall 61 and received into a hole 65b of lower end of 68 of impeller shaft 66. Shafts 29 and 72 frictionally engage into hole 65a and 65b, respectively, to mount agitator 28 to impeller 18 and gear 70 to impeller shaft 66, respectively.

Hand crank 20 has a shaft 74 that extends through a hole 76 in a right wall 78 of right housing portion 13b to engages into one end of a shaft 79 of a gear 80. The other end of shaft 79 rotates in a hole 82 within right housing portion 13b. A pinion gear 84 has teeth 85 that engage (mesh) with teeth 81 along gear 80. The pinion gear 84 is mounted on one end of a rotational shaft 86 that extends through a cylindrical opening 87 in right housing portion 13b, where the other end is shaft 86 is mounted to a gear 88 having beveled teeth 89 that engage (mesh) with the beveled teeth 71 of gear 70 mounted to impeller shaft 66. The axis of rotation of gears 84 and 88 and their connecting shaft 86 are the same, and such axis of rotation lies co-axial with the axis of rotation of gear 80 and perpendicular to the axis of rotation of impeller shaft 66. Thus, turning hand crank 20 clockwise or counter-clockwise transfers rotation of crank 20 to impeller 20 via gears 80, 84, 88, and 70, and rotating shaft 86 (coupling rotation of gears 84 and 88), and thereby provides a drive mechanism for rotating impeller 40 as well as agitator 28 (if present). The impeller 18 when rotated with particulate material falling thereupon projects such particulate material out of chamber 58 through discharge opening 17, as illustrated by dashed arrow 90 (FIG. 10). As discharge opening 17 extends along the front and left side of chamber 58, such provides a wide angle for distributing particulate material onto a surface, such as ground, walkway, or road, as desired. Accordingly, a mechanism is provided in base 12 for spreading particulate material by rotating impeller 18 responsive to rotating hand crank 20.

Gate 62 is a flat member that can move forward or backward in the gap between apertures 26a and 26b of top wall 22 and upper chamber wall 60, respectively, that form opening 26, by being mechanically coupled to movement of trigger 92. Trigger 92 is disposed along an opening 93 of housing portion 15. Gate 62 is coupled to trigger 92 via a linkage member 94 that angles upwards from gate 62 along a passageway 95 within housing portion 15 to trigger 92. An extension member 96 extends downwardly within the handle portion 15 providing handle 11 and applies a forward bias to the integrated structure of trigger 92, linkage member 94 and gate 62, so that normally gate 62 is disposed in a closed state below upper wall 20 along opening 26 and prevents particulate material along path 64 from entering chamber 20, via opening 26, until trigger 92 is pulled back by a user to enable flow along path 64 through opening 26 (via opening 50, 54, or 110 of hopper 14a, 14b, or 14c, respectively, when attached to base 12) as desired. Thus, a mechanism using trigger 92 as an actuator member in base 12 provides control flow of particulate material into chamber 58 along path 64 when particulate material is presented to opening 26 via one of hoppers 14a-14c. The amount of forward bias on trigger 92 may be set by moving a lever 98 along a slot 99 in the handle portion 15. Lever 98 extends to a pinion member 100 that is movable along a ratchet surface 101 at the lower end of extension member 96. Screws 102 extend through holes 103 in right wall 78 and the handle portion 15, and holes 105, of right housing portion 13b into threaded holes 104 molded along the left housing portions 13a to assembly base 12 and retain the components described above therein.

Referring to FIGS. 11-14, a hopper 14c of the third type is shown, and is the same as hopper 14a and 14b, and accordingly uses the same reference numerals, except for: a different top end 32a extending along sides 31 to top wall 107; an opening 106 along top wall 107 provided by a threaded collar 108 closed by an internally threaded cap 109; an opening 110 along bottom wall 30 for passage of particulate material out of the hopper; and hole 52 of hoppers 14a and 14b removed. Hole 52 is not needed as agitator 28 is not used with hopper 14c when attached to base 12 to provide spreader 10c, such attachment being in the same manner as hopper 14a to base 12 described earlier. While the slide member 36 of FIG. 12 of hopper 14c is provided without ribbing as shown in other views, such ribbing may be also be used in hopper 14c.

Figure 15:
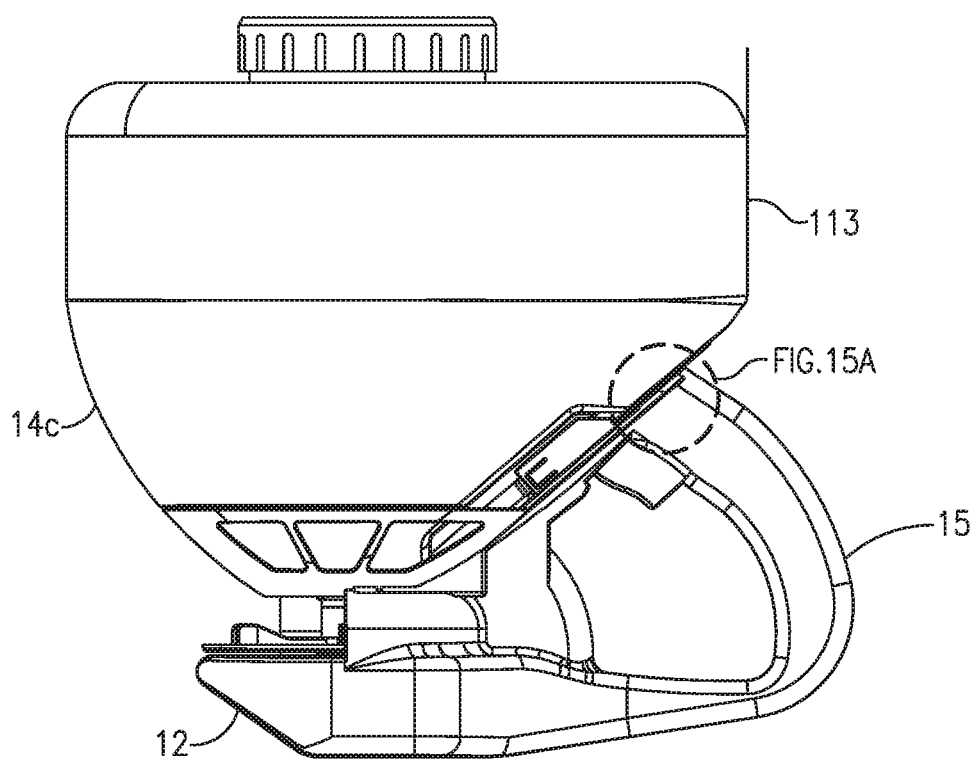
FIG. 15 is a left side view of the hand-held spreader of FIG. 13.
Figure 15A:
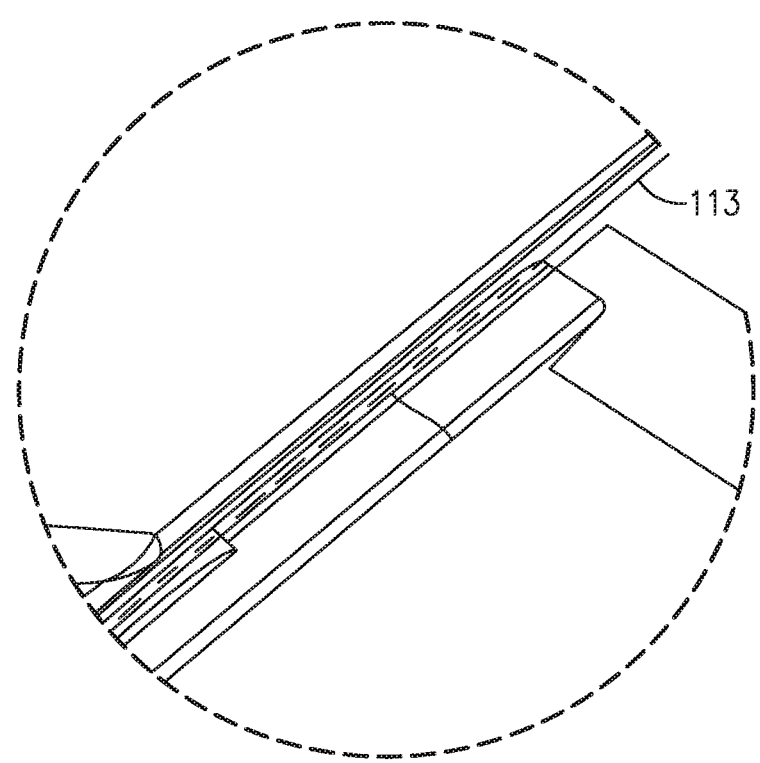
FIG. 15A is a more detailed view of the circled area 15A of FIG. 15.

To seal the particulate material in hopper 14c from the environment after such particulate material is received via opening 110, and such opening 110 is then closed by cap 109, a lower end 114 of a flexible strip (or sealing member) 113 covers the ridge 111 that extends about opening 110. Such seal of hopper 14c is preferably a hermetic seal. A low-adhesion adhesive may be provided along end 114 to assist is releasably retain end 114 over opening 110 until strip 113 is released by a user from hopper 14c after being attached to base 12 prior to using spreader 10c. For example, strip 113 may be of flexible thin plastic material, such as Mylar® with a co-laminate heat active adhesive coating or layer, which with applied heat activates the adhesive to adhere strip 113 onto ridge 111, and also onto an additional ridge 112 alongside ridge 111 to increase the amount of adhered to area along hopper 14c. A pull tab 116 is adhesively attached to upper end 115 of strip 113 and top 107 of hopper 14c to assist the user in pulling strip 113 from spreader 10c. Tab 116 also assists in maintaining strip 113 in position along the rear of hopper 14c so that it downwardly extend along angled portion 37, via a gap between slider member 36 and receiver member 40, to lower end 114 covering opening 110. This gap may be approximately 0.004 inches wide, which is sufficient for passage of strip 113. See FIGS. 15 and 15A. It has been found that while ridges 111 and 112 with its the adhered strip lower end 114 rests against top wall 22 of base 12 in spreader 10c prior to release of strip 113 therefrom, the force in pulling the strip 113 upwards to release the strip from the spreader overcomes adhesion to ridges 111 and 112 and any friction with top wall 22 facing such ridges.

In this manner spreader 10c enables hopper 14c to provide a ready to use container of particulate material, in which opening 110 is dimensioned for the particulate material contained. For example, opening 110 may be dimensioned the same or similar to opening 50 of hopper 14a for spreading seed, or same or similar to opening 54 of hopper 14b for use in spreading salt. After use of the spreader 10c, the hopper 14c may be reused by adding additional particulate material via opening 110 by removing cap 109.

The hoppers 14a-c and cap 109 are each preferably of injected molded plastic, such as polypropylene. The components of base 12 are preferably also of injected molded plastic, such as polypropylene, where parts of impeller drive mechanism, such as impeller, gears, and hand crank 26, are of low friction material, such as polyoxymethylene.

The dimensions of bottom openings 50, 54, and 110 of hoppers 14a-c, respectively, may be different than shown and described herein in accordance with desired particulate material to be spread when attached to base 12. Further, different types of hoppers than shown with different open or closable top ends may be used with base 12 to provide other hand-held spreaders in accordance with the present invention, so long as hoppers have sides and bottom which conform to the contour of upper wall 22 of base 12 along the base's handle portions 15 and distributor portion 16, and utilize the same mechanism for attaching to base 12 as hoppers 14*a-c*.

Thus, one of hoppers 14*a-c* is selected for attachment to base 12 to provide a desired hand-held spreader 10*a-c*, respectively. For each spreader 10*a-c*, once hopper 14*a-c*, respectively, is attached to base 12, such hopper is then not removable from the base. In other words, once slide member 36 engages receiver member 40 by having tabs 39 snap into openings 44, such is intended to permanently lock the hopper to the base. Less preferably, tabs 39 may be releasable from openings 44, by pushing them backwards and pulling the hopper up to allow slide member 36 to be released away from receiver member 40, thereby enabling the same or a different one of hoppers 14*a-c* to attach to base 12.

From the foregoing description, it will be apparent that there has been provided an improved hand-held spreader having different types of hoppers attachable to a common base, and a system providing different hand-held spreaders each having a different type of hopper for particulate material attachable to a common base housing a mechanism for spreading particulate material. Variations and modifications in the herein described apparatus, system, and method of use will undoubtedly suggest themselves to those skilled in the art. Accordingly, the foregoing description should be taken as illustrative and not in a limiting sense.

The invention claimed is:

1. A system providing different hand-held spreaders adapted to selectively distribute particulate material of different sizes, the system comprising:
   a) two or more hoppers each having a rear exterior angled portion and a bottom wall and upwardly extending side wall having an open top end configured to receive a respective particulate material therein, wherein said bottom wall includes a bottom opening configured to allow passage of the particulate material therethrough; and
   b) a universal base including a top wall having an upward angled portion extending in a rear upward direction at an oblique upward angle, said base complementarily attachable to a selected one of said hoppers, said base including:
      i) a cradle portion having a particulate opening and configured to removably receive said selected one of said hoppers in overlaying relation to said cradle portion with said hopper bottom opening aligned with said cradle portion particulate opening to allow flow and exiting of the particulate material therethrough;
      ii) a handle portion, wherein said upward angle portion of said base top wall transitions into said handle portion; and
      iii) an impeller for spreading the particulate material received from said aligned hopper bottom opening and said particulate opening of said cradle portion; and
   c) a hopper to base releasable attachment mechanism comprising a slide member and a receiving member, said slide member located on said rear exterior angled portion of the hoppers and said receiving member located on said handle portion of said upward angled portion of said base top wall,
   wherein said slide member includes two opposing channels each with an outwardly extending tab, and a front projecting member, and said receiving member includes a pair of rails defining a slot for receiving said slide member so that said rails ride along said channel until each of said tabs engages into an opening along a different one of said rails in order to fixably attach said selected one of said two or more hoppers to said base; and
   an opening for receiving said projecting member of said selected one of said two or more hoppers.

2. The system according to claim 1 wherein said bottom opening of one of said two or more hoppers is of a different size than said bottom opening of another of said two or more hoppers.

3. The system according to claim 2 wherein said open top end of one of said two or more hoppers has an upper edge forming a plurality of teeth.

4. The system according to claim 2 further comprising a third type of said two or more hoppers is a container having said bottom opening, said container comprising:
   an upper opening closed by a cap;
   a strip of flexible material extending along an exterior of said container,
   said strip having a first end and a second end, said first end extends over the bottom opening of the container and is temporarily retained over said bottom opening to seal said container and a particulate material contained therein, and said second end extends upwards to provide a pull tab to release said first end away from said bottom opening of the container to enable flow of the particulate material from said bottom opening when said container represents said one of said two or more hoppers attached to said base, and a passageway for said strip is provided along said base enabling release of said strip from said container.

5. The system according to claim 1 wherein said base further comprises:
   a hand crank rotationally coupled to said impeller to enable rotation of said impeller.

6. The system according to claim 5 wherein at least one of said two or more hoppers has a bottom with a bottom hole, and said system further comprises a rotatable agitator located on said bottom adjacent said bottom hole, said agitator having a shaft which extends through said bottom hole to engage said impeller so that rotation of said impeller rotates said agitator.

7. The system according to claim 1 wherein said base further comprises a support member extending upwards along a portion of the exterior of said selected one of said two or more hoppers when attached to said base, in which wherein said opening for receiving said front projecting member of said selected one of said two or more hoppers is provided along said support member.

8. The system according to claim 5 wherein said base has a first portion which includes said handle portion, and a second distributor portion which includes said rotationally mounted impeller, said distributor portion having top wall having a top surface facing a bottom exterior portion of said selected one of said two or more hoppers when attached to said base, and said top wall has an opening for receiving the particulate material along a path onto said impeller.

9. The system according to claim 8 further comprising a movable trigger along said first portion, and a movable gate mechanically coupled to said trigger and extendible along said opening of said top wall in said path of particulate material from said one of said two or more hoppers, in which said trigger is biased forward to normally close said gate over said opening of said top wall to prevent the particulate material from falling onto the impeller along said path, and backward motion of said gate by pulling back said trigger enables flow via said opening along said top wall along said path.

10. The system according to claim 5 wherein said impeller comprises a circular platform having an upper surface with a plurality of vanes.

11. The system according to claim 5 wherein said base has a discharge opening through which said particulate material falling on said impeller are distributed away from said spreader.

12. The system according to claim 5 wherein said base comprises a plurality of gears, wherein one of said gears extends downward along the underside of said impeller to engage another of said gears which rotates responsive to the hand-crank.

13. The system according to claim 5 wherein said base has a chamber with an upper wall and a lower wall, said impeller has a shaft extending along an axis of rotation of said impeller journalled for rotation in an upper hole in said chamber, and said base having gears for rotating said impeller responsive to said hand crank, wherein one of said gears is coupled with a second end of said shaft through a lower hole in said lower wall of said chamber.

\* \* \* \* \*